INVENTOR
EDISON LOWE
WILLIAM C. ROCKWELL
ATTORNEY

May 15, 1956 E. LOWE ET AL 2,745,194
CONTINUOUS BELT TROUGH DRIER
Filed Jan. 16, 1953 4 Sheets-Sheet 3

INVENTOR
EDISON LOWE
WILLIAM C. ROCKWELL
BY
ATTORNEY

May 15, 1956  E. LOWE ET AL  2,745,194
CONTINUOUS BELT TROUGH DRIER
Filed Jan. 16, 1953  4 Sheets-Sheet 4

INVENTOR
EDISON LOWE
WILLIAM C. ROCKWELL
BY
ATTORNEY

United States Patent Office

2,745,194
Patented May 15, 1956

2,745,194
CONTINUOUS BELT TROUGH DRIER

Edison Lowe, El Cerrito, and William C. Rockwell, Richmond, Calif., assignors to the United States of America as represented by the Secretary of Agriculture Application January 16, 1953, Serial No. 331,753

5 Claims. (Cl. 34—233)

(Granted under Title 35, U. S. Code (1952), sec. 266)

A non-exclusive, irrevocable, royalty-free license in the invention herein described, for all governmental purposes, throughout the world, with the power to grant sublicenses for such purposes is granted to the Government of the United States of America.

This invention relates to dehydrators and the general object thereof is the provision of continuous belt trough dehydrator useful for dehydrating fruits or vegetables such as peas, lima beans, diced carrots, prunes, sliced apples; meats; nuts; or other solid materials.

The advantages of the invention include the following:

Uniform drying is obtained in that each piece of material is dried to the same extent because the material is continuously mixed and the air for evaporation of moisture goes through a bed of the material, not just over or under it.

The material is not crushed or broken during drying because the mixing is gentle yet thorough. Edges of materials such as apple slices are not rounded off as with devices which exert excessive mixing forces.

The device can be operated for long periods of time without requiring shut-downs for cleaning because the belt can be cleaned during operation without interference with the drying process—this is very important with dehydration of foods where sanitary conditions must be maintained. By operating for long periods without shut-down, important economic effects are gained and the amount of substandard product produced during periods of shut-down and start-up, when thermodynamic conditions are transient and not in equilibrium, is reduced to a minimum.

The device is flexible in that it is capable of handling a wide variety of solid materials and the degree of dehydration can readily be changed by control of the air volume and temperature, slope and rotary speed of the belt, and rate of feed of the material to be dried.

Further objects and advantages of this invention will be apparent from the following description, considered together with the accompanying drawing.

Figure 1:
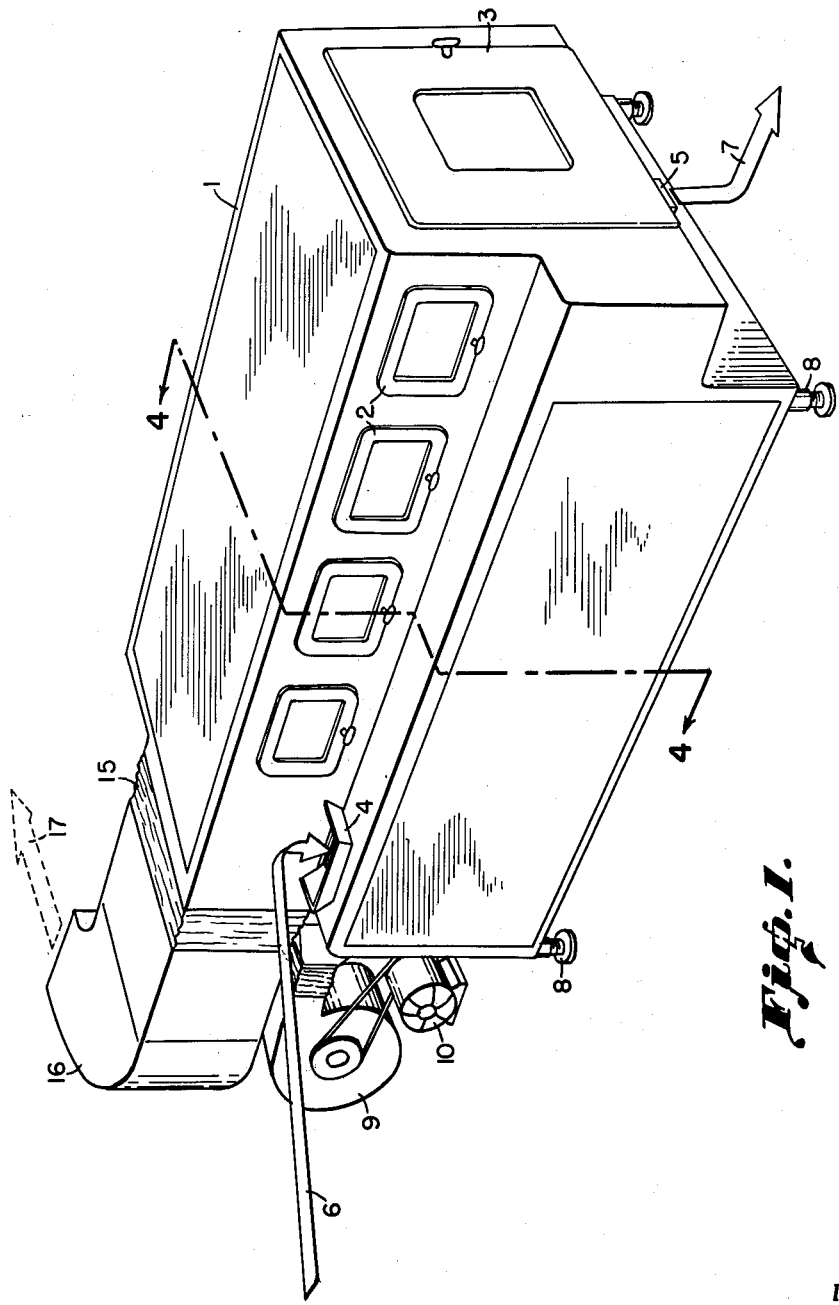
Fig. 1 is a three-dimensional over-all view of one embodiment of the invention.

Referring with more particularity to the drawing in which like numerals represent like parts, the embodiment illustrated in Figs. 1 to 4 includes a housing 1. Doors 2 and 3 are provided for observation, sampling and cleaning purposes; the top and sides of the housing may also be provided with removable panels for repairs, cleaning, etc. Material to be dried enters through hopper 4, the dried material is discharged through duct 5, the direction of material through the drier being represented by arrows 6 and 7. Adjustable legs 8 are provided so that the slope of the drier may be adjusted. In operation the device is always higher at the feed end than the discharge end with a slope of about $\frac{1}{16}''$ to about $1''$ per foot. The exact degree of slope may be adjusted as necessary with different materials, rate of drying, etc.

Air for evaporating moisture from the material to be dried enters duct 18, as indicated by arrow 17a, and is forced by blower 9, driven by motor 10, into chamber 11 where the air is heated by steam coils or other conventional means. The hot air then flows into chamber 12 for distribution to the material to be dried. Flexible connections 13 and 14 are provided to allow for expansion and contraction and to minimize transmission of vibration. The exhaust air from the drier is withdrawn from the top of housing 1 via flexible connection 15 and duct 16, the direction of the exhaust air is indicated by arrow 17. Part of the exhaust air may be recycled back to blower 9 via duct 18, controlled by flap valve 19 (Fig. 3) to regulate the humidity of the air used for the dehydration.

Figure 2:
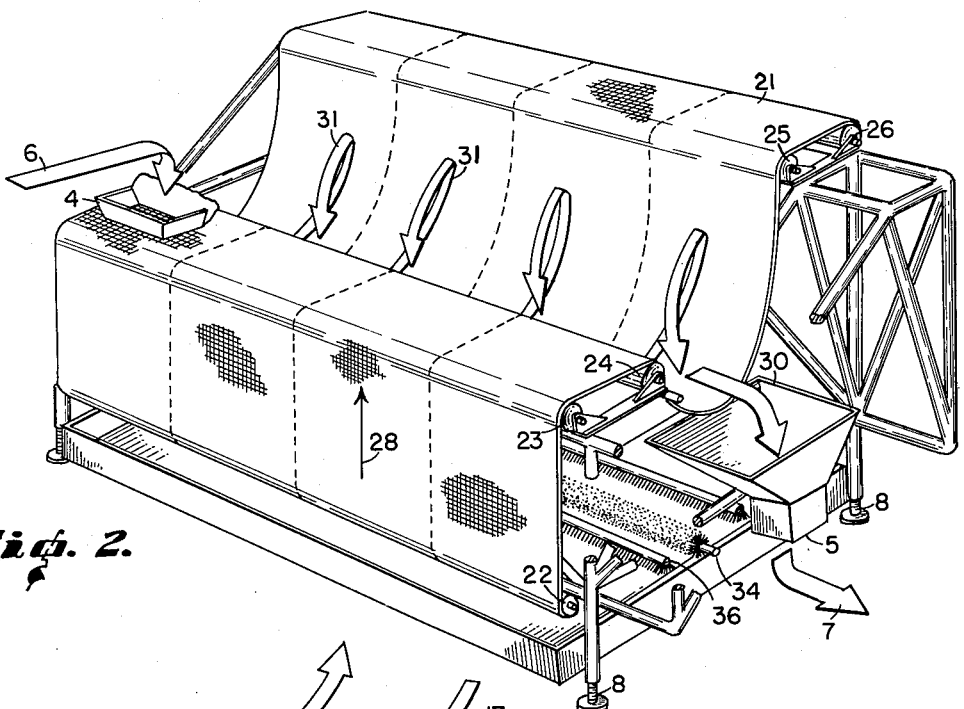
Fig. 2 is a three-dimensional view of the same embodiment, the housing and other parts being omitted.

Referring particularly to Fig. 2, endless belt 21, made of stainless-steel screening or other foraminous, flexible sheet material is supported on rollers 22, 23, 24, 25, 26, and 27. Rollers 24 and 26 are driven in a clockwise direction by suitable means such as a variable-speed electric motor (not illustrated). By driving both rollers 24 and 26 the loop in the belt between rollers 24 and 25 is maintained constant at all times. The direction of motion of the belt is indicated by arrow 28.

The material to be dried falls through hopper 4 onto the top surface of belt 21 whereby it is carried by the transverse movement of the belt into the hanging loop of the belt near the feed end of the drier, at approximately position 29. As the drying proceeds, the material in the hanging loop or trough remains therein and moves toward the discharge end of the drier eventually being discharged into hopper 30 and duct 5. Due to the transverse motion of the belt, the material does not remain quiescent but is subjected to continuous mixing. Thus the material nearest the belt (at the bottom of the layer) tends to ride up the belt in the direction of belt traverse. At a certain point dependent on the slope and the nature of the material in question, this riding material will then slide back down the top of the pile. However due to the slope of the drier toward the discharge end, the sliding material will move somewhat toward the discharge end of the drier as well as downward. The ascending and descending paths of the material in the trough is clearly shown by arrows 31 in Fig. 2 and arrows 32 in Fig. 4. This continuous but gentle mixing action contributes greatly toward obtaining uniform dehydration.

Figure 4:
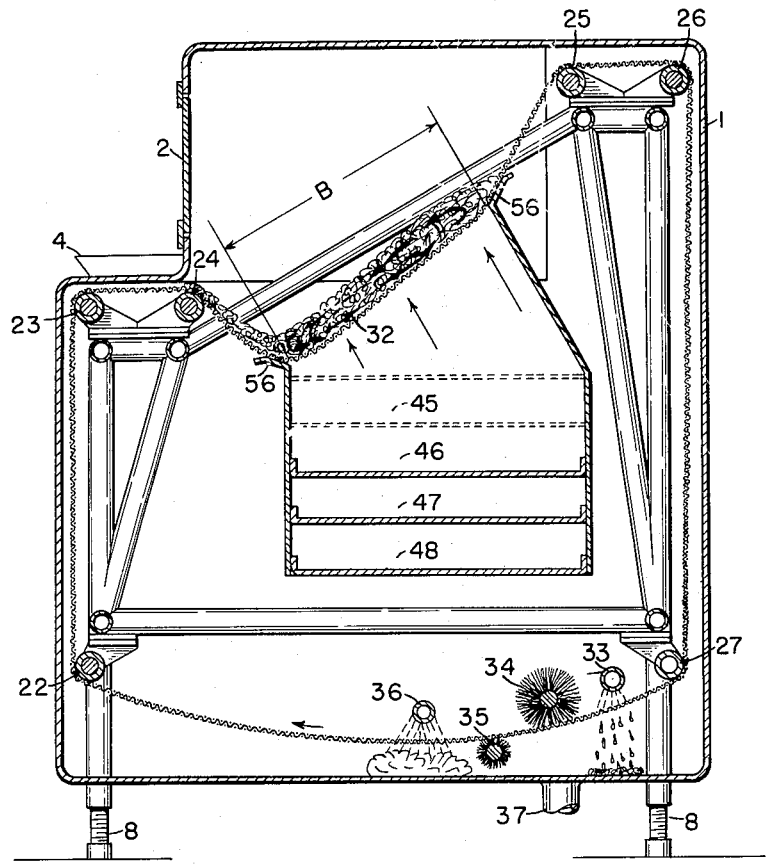
Fig. 4 is a cross sectional view taken on plane 4—4 of Fig. 1.

Referring to Figs. 2 and 4, apparatus is provided for continuously cleaning the belt 21. This apparatus includes perforated pipe 33 for drenching the belt with hot water, rotating brushes 34 and 35 for scrubbing the belt, and perforated pipe 36 for applying hot air or steam to the cleaned belt for drying it. Wash water and debris are drained through pipe 37.

Figure 3:
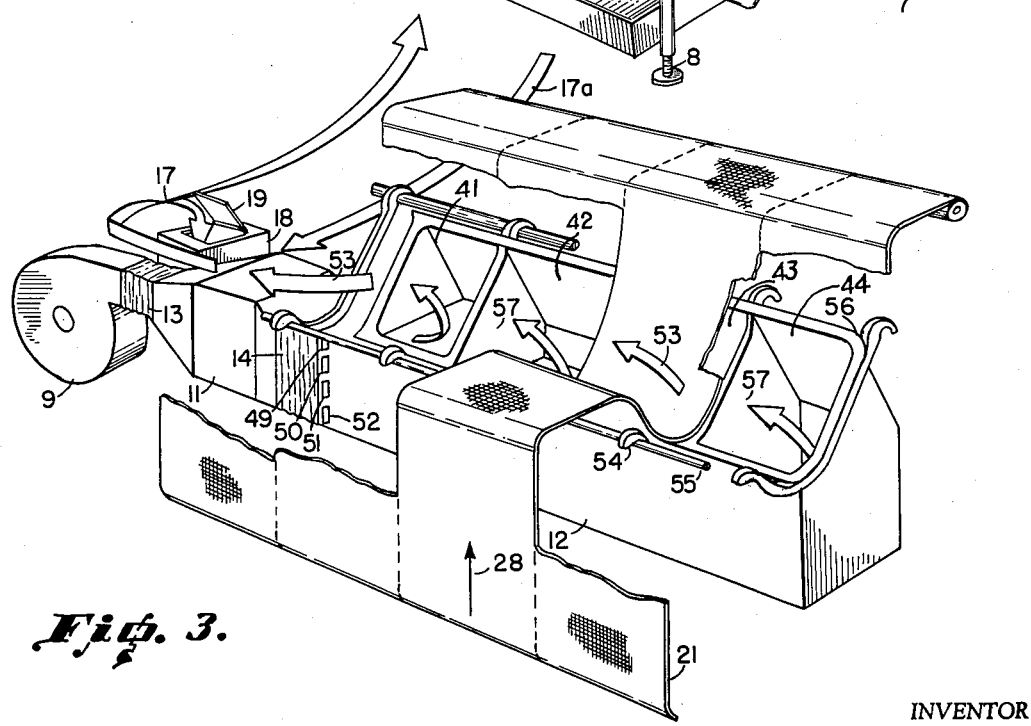
Fig. 3 is a three-dimentional view of the same embodiment, the belt and other parts being cut away.

Referring particularly to Fig. 3, chamber 12 is divided transversely into four compartments 41, 42, 43, and 44. By the use of this compartmentization, the material on belt 21 above each compartment may be subject to a different volume of air. Thus the lower part of chamber 12 is divided into four longitudinal ducts 45, 46, 47, and 48 (see Fig. 4), the first of these ducts (45) connecting with compartment 41, the second duct 46 connecting with compartment 42, and so on. Slide valves 49, 50, 51, and 52 are provided to individually regulate the volume of air entering ducts 45, 46, 47, and 48, respectively. This arrangement of valves, ducts, and compartments gives great flexibility in controlling the degree of drying. The air from the compartments after passing through the bed of material on belt 21 passes in a direction toward the feed end of the drier at the top of the housing as illustrated by arrows 53 and is eventually discharged or part recycled as above described.

Chamber 12 is supported within housing 1 by hangers 54 resting on rods 55. This construction enables the removal of the chamber 12 through door 3, after disconnection of flexible connection 14, for cleaning purposes.

Chamber 12 also provides a support for and forms an air seal with the trough of belt 21. Thus in operation the trough portion of belt 21 is supported on flange 56, which is continuous about the upper part of chamber 12 including the upper edges of the partitions 57 dividing the chamber into compartments 41, 42, 43, and 44. By reason of this continuous flange surface the trough portion of the belt is supported at both sides and both ends of the trough and at intermediate points between the ends of the trough. This means that the portion of the trough which overlies chamber 12 (section B in Fig. 4) can be maintained almost flat and hence the bed of material in this section (58 in Fig. 4) is maintained nearly uniform in depth whereby the resistance to air flow at any point in the bed will be nearly the same and hence the volume of air flowing through any point in the bed is nearly the same and uniform drying will take place. Without this support, the belt would tend to sag in the middle with the result that the bed would be thickest at the middle and thin at the edges. In such cases air flow through the middle of the bed would be impeded whereas air flow at the edges would contact but few particles of material.

It is obvious that the speed of traversal of belt 21 and other factors or parts must be correlated or adjusted so that the top opening of chamber 12 underlies a major portion of the bed of material. In this way the major part of the bed is subjected to the air blast. Because of the tendency of the material to ride up the belt this necessitates positioning chamber 12 not at the center of the trough but displaced toward the direction of traverse of the belt as clearly shown in Fig. 4. Another point to be mentioned is that the width of the bed (B in Fig. 4) must be correlated with the width of the opening in chamber 12. The width of the opening in chamber 12 should be a little less than the width of the product bed to prevent passage of air around rather than through the bed.

Figure 5:
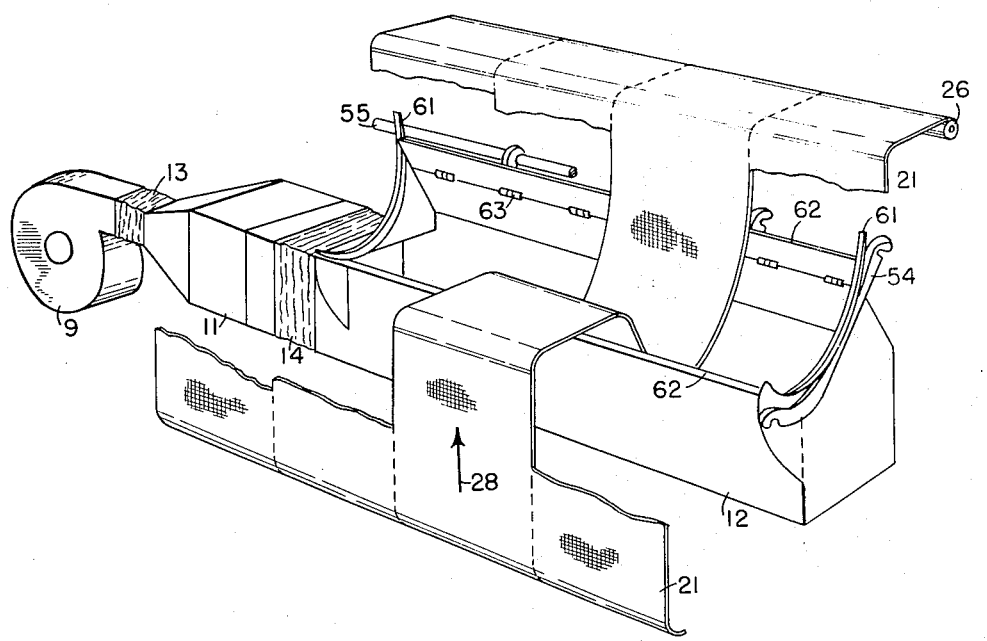
Fig. 5 is a three-dimensional view of another embodiment of the invention, the housing, sections of the belt and other parts being omitted.

Referring to Fig. 5, there is illustrated a somewhat simplified modification of our invention. In this case, chamber 12 is not compartmentalized; the hot air from heater 11 enters chamber 12 and is applied to all parts of the material in the trough. In this case, the edges of belt 21 press on curved sealing surfaces 61 made of flexible material. To provide a seal at the edges of the opening in chamber 12 there is provided flaps 62 which are hinged at 63 to the walls of chamber 12 and press against the bottom of belt 12 by spring action. In this embodiment, a greater part of the belt is not supported so that it will assume a shape dependent on the tension of the belt and the weight of material on it.

Having thus described our invention, we claim:

1. A dehydrator comprising an endless foraminous belt, means for continuously traversing said belt in its lengthwise direction, means for maintaining part of the belt in the form of a trough extending across the width of the belt, one end of said trough being higher than the other, means for depositing material to be dried in the upper end of the trough, means for removing dried material from the lower end of the trough, a chamber extending along the width of the belt under the trough portion thereof, a longitudinal opening in the top portion of said chamber, said opening being positioned to underlie the bed of material in said trough, the area of the opening being slightly less than the area of the bed of material, flanged supported surfaces about said opening to maintain the trough portion of the belt overlying the opening in an almost flat plane, and means for forcing a gaseous dehydrating medium into said chamber, out of said opening, and through the bed of material overlying said opening.

2. A dehydrator comprising a housing, an endless foraminous belt, means for continuously traversing said belt in its lengthwise direction, means for maintaining part of the upper traverse of the belt in the form of a trough extending across the width of the belt, one end of said trough being higher than the other, a hopper for introducing material to be dried onto said belt whereby the material is conveyed by the motion of the belt into the upper end of the trough, and further by the motion of the belt in cooperation with the slope of the trough is conveyed with continuous mixing along the length of the trough to the lower end thereof, hopper means for receiving and discharging dried material conveyed to said lower end of the trough, a chamber divided into compartments extending along the width of the belt under the trough portion thereof, apertures in the tops of said compartments forming a series of openings extending along the length of said chamber, said series of openings being positioned to underlie the bed of material in said trough, the area of the series of openings being slightly less than the area of the bed of material, flanged supporting surfaces about said series of openings to maintain the trough portion of the belt overlying the series of openings in a nearly flat plane, means for forcing a gaseous drying medium into each of said compartments, out of said series of openings and through the bed of material overlying said openings, separate valve means for controlling the flow of gaseous medium to each of said compartments, and means for continuously cleaning the belt.

3. A dehydrator comprising an endless foraminous belt, means for continuously traversing said belt in its lengthwise direction, means for maintaining part of the belt in the form of a trough extending across the width of the belt, means for introducing material to be dried into one end of said trough, means for removing dried material from the other end of said trough, a chamber divided into compartments extending along the width of said belt under the trough portion thereof, apertures in the tops of said compartments forming a series of openings extending along the length of said chamber, said series of openings being positioned to underlie the bed of material in said trough, flanged supporting surfaces about said series of openings to maintain the trough portion of the belt overlying the series of openings in the form of an inclined plane, the plane sloping upwardly in the direction of belt traverse, the degree of incline being such that the material on the planar portion of the trough is maintained as a bed of essentially uniform depth, means for forcing a gaseous drying medium into each of said compartments, out of said series of openings and through the bed of material overlying said openings and separate valve means for controlling the flow of gaseous medium to each of said compartments.

4. The apparatus of claim 3 including means for maintaining part of said belt beneath said trough and cleaning means cooperative with a portion of said belt extending beneath said trough for continuously cleaning said belt.

5. A dehydrator comprising a foraminous belt, means for continuously traversing said belt in its lengthwise direction, a pair of spaced rollers on which the belt rides for maintaining the portion of the belt between said rollers in the form of a trough extending across the width of the belt, said trough portion of the belt providing the means for supporting a bed of material undergoing dehydration, a chamber extending along the width of the belt beneath the trough portion thereof, a sloping opening in the upper part of the chamber, said opening underlying the trough portion of the belt, belt-supporting ledges about said opening, said ledges defining an inclined plane thereby maintaining the trough portion of the belt overlying the opening in the form of an inclined plane, said plane being spaced downwardly from the plane which passes through the axes of said rollers, the plane sloping upwardly in the direction of belt traverse, the degree of slope being such that the material on the planar portion of the belt is maintained as a bed of essentially uniform depth, and means for forcing a gaseous dehydrating medium into said chamber, out of said opening, and through the bed of material overlying said opening.

References Cited in the file of this patent

UNITED STATES PATENTS

| | | |
|---|---|---|
| 2,308,420 | Hoopes | Jan. 12, 1943 |
| 2,412,763 | Baker | Dec. 17, 1946 |
| 2,424,229 | Erisman | July 22, 1947 |
| 2,501,487 | Whitman | Mar. 21, 1950 |

FOREIGN PATENTS

| | | |
|---|---|---|
| 95,687 | Sweden | May 9, 1939 |
| 531,346 | Great Britain | Jan. 2, 1941 |
| 566,662 | Great Britain | Jan. 9, 1945 |